(12) United States Patent
Weiss

(10) Patent No.: US 6,854,937 B1
(45) Date of Patent: Feb. 15, 2005

(54) DUST COLLECTOR ATTACHMENT FOR A SPIRAL POWER TOOL

(76) Inventor: Stephen F. Weiss, P.O. Box 1867, Woodinville, WA (US) 98072

( * ) Notice: Subject to any disclaimer, the term of this patent is extended or adjusted under 35 U.S.C. 154(b) by 0 days.

(21) Appl. No.: 09/638,835

(22) Filed: Aug. 14, 2000

(51) Int. Cl.[7] .......................... B23C 1/20; B23Q 11/20; B23Q 11/08

(52) U.S. Cl. ...................... 409/137; 409/134; 409/182; 408/67; 144/252.1; 144/251.2; 144/136.95; 29/DIG. 86; 29/DIG. 84

(58) Field of Search ................................ 409/182, 137, 409/134, 131; 408/67, 61, 56; 144/136.95, 251.1, 251.2, 252.1, 136.5; 83/100; 30/475, 477; 29/DIG. 86, DIG. 84

(56) References Cited

U.S. PATENT DOCUMENTS

| | | | | |
|---|---|---|---|---|
| 994,430 A | * | 6/1911 | Tunks | 29/DIG. 86 |
| 3,786,846 A | * | 1/1974 | Mehring | 29/DIG. 86 |
| 3,942,411 A | * | 3/1976 | Gerber | 409/137 |
| 4,037,982 A | * | 7/1977 | Clement | 408/61 |
| 4,200,417 A | * | 4/1980 | Hager et al. | 144/251.2 |
| 4,652,184 A | * | 3/1987 | Fischer | 175/209 |
| 4,674,548 A | * | 6/1987 | Mills et al. | 409/182 |
| 4,738,571 A | * | 4/1988 | Olson et al. | 409/137 |
| 4,752,161 A | * | 6/1988 | Hill | 408/67 |
| 5,026,221 A | * | 6/1991 | Arai et al. | 407/115 |
| 5,034,041 A | * | 7/1991 | Austin | 409/137 UYR |
| 5,143,490 A | * | 9/1992 | Kopras | 407/54 |
| 5,323,823 A | * | 6/1994 | Kopras | 407/54 |
| 5,356,245 A | * | 10/1994 | Hosoi | 408/56 |
| 5,451,122 A | * | 9/1995 | Noda et al. | 407/115 |
| 5,584,620 A | * | 12/1996 | Blickhan et al. | 144/252.1 |
| 5,688,082 A | * | 11/1997 | Richardson | 408/67 |
| 5,947,661 A | * | 9/1999 | Sugata | 408/1 R |
| 5,988,954 A | * | 11/1999 | Gaskin et al. | 408/67 |
| 6,079,078 A | * | 6/2000 | Byington | 408/67 X |
| 2002/0187014 A1 | * | 12/2002 | Bergner | 409/182 |

FOREIGN PATENT DOCUMENTS

DE          3734127 A1 *  4/1989

* cited by examiner

Primary Examiner—Erica Cadugan
(74) Attorney, Agent, or Firm—Jensen & Puntigam, P.S.

(57) ABSTRACT

The dust attachment which is used with a spiral saw power tool includes a first attachment portion which at a rear end has a substantially dust-tight fit with a mounting head portion of the tool. The other (forward) end extends beyond a forward edge of the mounting head portion, but such that the spiral saw bit extends beyond the forward edge of the attachment portion by a distance which is slightly greater than that of the thickness of the workpiece. An attaching member such as a screw secures the dust attachment portion to the tool. An dust exit tube extends from a side surface of the attachment portion and communicates with the interior of the attachment portion. The dust exit tube extends at an angle away from the attachment portion toward the rear end thereof.

9 Claims, 2 Drawing Sheets

DUST COLLECTOR ATTACHMENT FOR A SPIRAL POWER TOOL

TECHNICAL FIELD

This invention relates generally to power tools, and more specifically concerns a dust collector attachment for particular power tools, including a spiral saw power tool.

BACKGROUND OF THE INVENTION

A spiral saw power tool is used to cut sheetrock construction material, among other things. The spiral saw bit looks somewhat like a conventional drill bit, but has a spiral or reverse spiral configuration of teeth/cutting edge which rapidly cuts a variety of construction materials, including sheetrock, wood, even tile. Different bits are used for different materials. While convenient and very fast, the tool in typical use generates an enormous amount of dust, particularly in cutting sheetrock, and spreads it over a large area. The dust is not only difficult and time-consuming to clean up, but can present a health hazard to the user of the tool, particularly during actual cutting operations. While some tools are designed to capture a certain amount of dust, the sheer volume of dust created by a spiral saw in typical sheetrock cutting operations prevents such conventional devices from being effective.

Hence, an attachment for dust-generating power tools, such as a spiral saw, which is effective in capturing the dust would be quite desirable.

DISCLOSURE OF THE INVENTION

Accordingly, the present invention is an attachment for a spiral saw power tool, comprising: a first attachment portion, adapted to be secured to a forward portion of a spiral saw power tool in which a spiral saw bit is mounted, wherein, when the first attachment portion is in place on the power tool, a forward end of the first attachment portion extends beyond a leading edge of the forward portion of the power tool but such that the tip of a cutting portion of the spiral saw bit extends beyond the forward end of the first attachment portion by a distance at least equal to that of the thickness of the workpiece to be cut by the spiral saw; and a dust exit member communicating with the interior of the first attachment portion, said dust exit member extending away from a side surface of the first attachment portion, wherein dust generated during use of the tool is substantially collected within the first attachment portion and then moved out from the interior thereof through the dust exit member by a vacuum device connectable to the dust exit member such that dust can continue to collect within the attachment portion without affecting the operation of the tool.

BEST MODE FOR CARRYING OUT THE INVENTION

Figure 1:
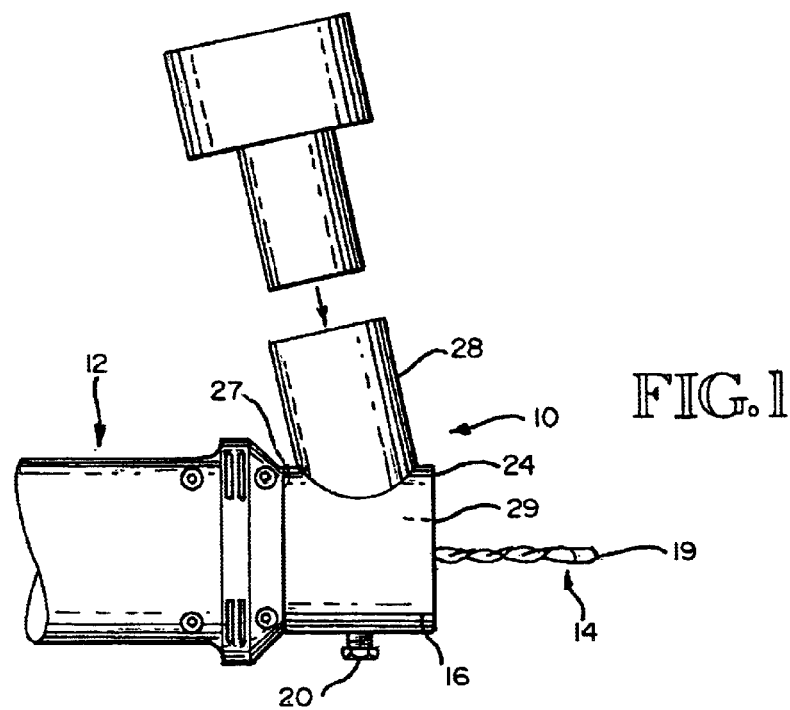
FIG. 1 is a side elevational view of the dust collector attachment of the present invention positioned on a spiral saw power tool, with a hose attachment shown exploded away.

Referring now to FIG. 1, the dust collector attachment of the present invention is shown generally at 10 in position on a power tool, specifically, a spiral saw. The power tool is referred to generally at 12, while the spiral saw tool bit is shown generally at 14. The dust collector attachment 10 includes a cylindrical section 16 which in the embodiment shown for a particular spiral saw is approximately 1-⅛ inches long, with a diameter of 2-⅜ inches to match the tool. The cylindrical section 16 in the embodiment shown is made of ⅛-inch thick ABS plastic. The cylindrical section 16 could, of course, be made of different materials and will have other configurations than that shown to match the particular power tool with which it is to be used.

Figure 2:
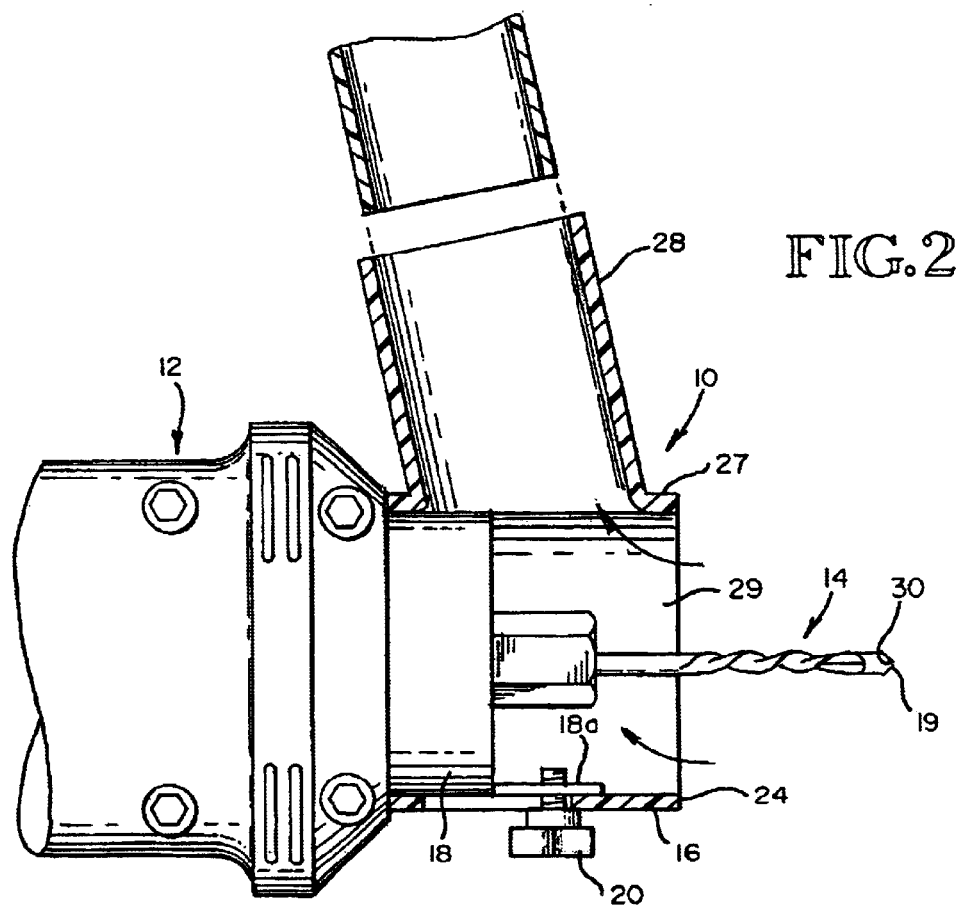
FIG. 2 is a cross-sectional view of the combination of FIG. 1.

The internal diameter of cylindrical section 16 mates with the external surface of a mounting head portion 18 (FIG. 2) of power tool 12. Cylindrical section 16 is designed to fit securely around the circumference of mounting head 18 so as to provide a substantially dust-tight connection therebetween. Cylindrical section 16 could include a flexible gasket or similar mating element to mate cylindrical section 16 to the exterior surface of the mounting head 18.

A mounting screw or bolt 20 is provided to secure cylindrical section 16 to mounting head 18 or a short mounting extension 18a. The opening for mounting screw 20 in cylindrical section 16 can be elongated so that cylindrical section 16 can be moved through a range of positions longitudinally relative to mounting head 18 and free end 19 of spiral saw tool bit 14. It is important that cylindrical section 16 be secured to the mounting head; however, many diverse ways could be employed to accomplish the same objective, including a tight frictional fit.

The length of cylindrical section 16 is such that free end 19 of spiral saw tool bit 14 extends beyond a forward edge 24 of the cylindrical section. This is a significant feature and will be discussed in more detail below. Extending from a side surface 27 of cylindrical section 16 is a dust exit tube 28. Dust exit tube 28 extends through the side surface 27, communicating with interior 29 of cylindrical section 16. In the embodiment shown, dust exit tube 28 extends from an integral connection (approximately longitudinally midway) with side surface 27 of cylindrical section 16. Dust exit tube 28 is circular in cross-section, with a diameter of approximately 1-⅜ inches, although this could be varied. Dust exit tube 28 angles rearwardly away from the side surface of cylindrical section 16. In the embodiment shown, the angle relative to the side surface of cylindrical section 16 is in the range of 10°–45°, and is preferably approximately 15°.

Cylindrical section 16 is positioned on mounting head 19 of the tool such that the end edge 30 of the cutting portion of the spiral saw bit 14 extends beyond forward edge 24 of the cylindrical section by a distance which is slightly greater than the thickness of the workpiece to be cut by the saw. The end edge of the cutting portion is typically a small distance from the tip of the bit. Typically, a spiral saw is used to cut construction materials such as wallboard (sheetrock), but it also can be used to cut conventional lumber products, and other materials. Different bits are used for different materials.

In use of the tool with the attachment of the present invention, the operator initially presses the saw bit directly (at a right angle) against a surface 29 of workpiece 31 and saws through the workpiece until the cutting tip of the spiral saw penetrates the other surface 33 of the workpiece. In this position, forward edge 24 of cylindrical section 16 should abut or come close to near surface 29 of workpiece 31. The angle on the dust exit tube 28 and its mid-point position in the side surface of the cylindrical section provides adequate clearance between the dust exit tube 28 and near surface 29 of workpiece 31. Hence, it is desirable to have the dust exit tube at an) angle relative to the side surface of the cylindrical section.

Figure 3:
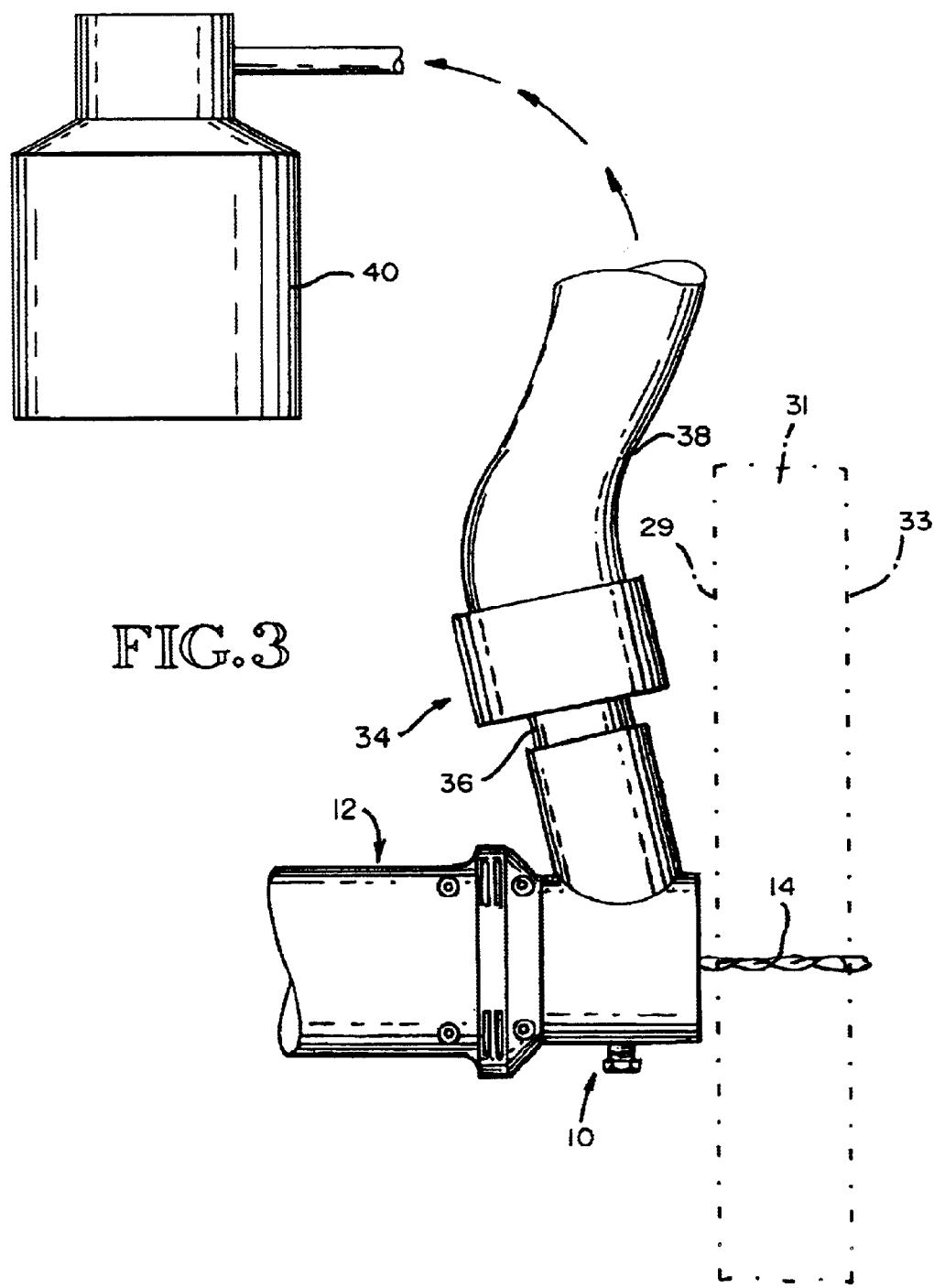
FIG. 3 is a perspective view of the dust collector attachment of the present invention connected as part of a complete vacuum system.

The position of exit tube 28 relative to the workpiece 31 is shown in FIG. 3. When the drill bit 14 has penetrated the workpiece, the operator then moves the tool along the surface of the workpiece, following a desired cutout path defined by an underlying frame structure against which the workpiece is positioned. This technique can be used for various size openings, including openings for electrical outlets, as well as doors and windows. For instance, wallboard (sheetrock) can be nailed into its desired (permanent) location. The opening for a window or other opening can then be simply and easily cut by simply penetrating the wallboard with the saw bit, which is rotating at a high speed, cutting the sheetrock to the boundary of the opening indicated by the window frame or the frame edge of the electrical box, and then following the edge of the frame edge until the opening is completely cut out. This is a convenient technique and results in less errors than marking and making cuts prior to installation.

The cutting of construction materials, particularly wallboard, with the spiral saw creates a large amount of dust, as indicated above, particularly when the opening is larger than an electrical socket box, which would normally be spread over a large area if not restrained. The spiral drill bit 14 in normal operation rotates at a high speed, approximately 30,000 rpm. It quickly cuts wallboard or other material. The generated dust collects in the interior of the cylindrical section 16. Forward end 24 is positioned to abut or is close to the near surface 29 of the workpiece. A tight seal is not necessary. Without the use of dust exit tube 28, the cylindrical section 16 would, however, quickly fill up with dust. In the embodiment shown, dust exit tube 28 is approximately 2 inches long and tapers slightly inwardly from its place of connection with the cylindrical section, i.e. the diameter of tube 28 decreases slightly over its length.

Dust exit tube 28 connects to a hose fitting 34, which has a nozzle portion 36 at one end thereof which is tapered to mate with the tapered dust exit tube 28. Extending from the other end of hose fitting 34 is a conventional, flexible hose 38 which extends to a vacuum source 40. Vacuum source 40 could be any one of various heavy-duty shop-type vacuums.

In operation, vacuum source 40 draws dust which collects in cylindrical section 16 out through dust exit tube 28. Typically, the vacuum source 40 will have sufficient capacity to collect the dust generated during several cutting operations and has sufficient power to draw in substantially all the generated dust, even if the forward end 24 of the cylindrical section is not positioned exactly against the workpiece. At an appropriate time, the collected dust can be removed from the vacuum source 40 and disposed of.

Hence, a system has been described concerning an attachment for a power tool, such as a spiral saw, for conveniently collecting the large amounts of dust generated by the power tool in use. The dust attachment is configured so that a forward end can be positioned adjacent the near surface of the workpiece during the sawing operations, with dust collecting in the interior of the dust attachment. Dust is drawn out of the interior of the attachment at a sufficient rate by a vacuum source to prevent the attachment from becoming filled with dust.

Although a preferred embodiment of the invention has been disclosed here for purposes of illustration, it should be understood that various changes, modifications and substitutions: may be incorporated without departing from the spirit of the invention, which is defined by the claims which follow.

What is claimed is:

1. An attachment for a hand-held spiral saw power tool, comprising:

a first rigid attachment portion, adapted to be secured to a forward portion of a hand-held spiral saw power tool in which a spiral saw bit is mountable, wherein the first attachment portion is structured and adapted to permit the first attachment portion to be secured to the forward portion of the power tool at various selected longitudinal positions therealong, so that when the first attachment portion is in a selected position on the power tool, the tip of a cutting portion of the spiral saw bit extends beyond the forward end of the first attachment portion by a distance at least equal to that of the thickness of the workpiece to be cut by the spiral saw, wherein the attachment portion is further adapted to permit a moving contact between a forward edge of the first attachment portion and an abutting surface of the workpiece to be cut by the spiral saw, the forward edge of the attachment portion being continuously flat, in a single plane, and defining an opening for the spiral saw, and wherein the attachment portion has an interior diameter at its forward edge which is more than two times greater than the diameter of the spiral saw, such that there is a substantial open space between the interior diameter of said forward edge of the attachment portion and the spiral saw through which dust moves into the attachment portion, the attachment portion having no openings therein which would allow air into the interior of the attachment portion during operation of the power tool other than the opening for the spiral saw, and wherein the forward edge of the attachment portion controls the depth of cut of the spiral saw and acts as a stop for the spiral saw when the forward edge of the attachment portion abuts the surface of the workpiece; and a dust exit member communicating with the interior of the first attachment portion, said dust exit member extending away from a side surface of the first attachment portion, wherein dust generated during use of the tool is substantially collected within the first attachment portion and then moved out from the interior thereof through the dust exit member by a vacuum device connectable to the dust exit member, such that dust can continue to collect within the attachment portion without affecting the operation of the tool.

2. The attachment of claim 1, wherein said first attachment portion is arranged so that there is an approximately dust-tight relationship between the first attachment portion and the forward end portion of the power tool.

3. The attachment of claim 2, wherein the first attachment portion is a cylindrical section having an internal diameter such that an interior surface of the cylindrical section makes said approximately dust-tight connection with the forward end portion of the power tool, near a rear end of the cylindrical section.

4. The attachment of claim 1, wherein the dust exit member extends at an angle from the first attachment portion at a connection port rearwardly of the forward edge of the first attachment portion.

5. The attachment of claim 4, wherein the dust exit member is a tube which tapers inwardly from its connection point with the first attachment portion to a free end of the dust exit member.

6. The attachment of claim 5, wherein said tube is adapted to mate with a fitting for a hose connection to the vacuum device.

7. The attachment of claim 1, including an attaching member for removably securing the first attachment portion to the power tool.

8. The attachment of claim 7, wherein the first attachment portion includes a longitudinal slotted opening through which the attaching member extends, permitting a range of adjustment of the first attachment portion longitudinally relative to the power tool, so that the first attachment portion can be used with workpieces of varying thickness.

9. The attachment of claim 1, wherein the dust exit member has a diameter approximately at least one half of the diameter of the first attachment portion.

* * * * *